United States Patent [19]

Miller

[11] 4,425,586

[45] Jan. 10, 1984

[54] APPARATUS AND METHOD FOR STORING AND INTERRELATING VISUAL DATA AND COMPUTER INFORMATION

[76] Inventor: Richard L. Miller, 233 Broadway, Suite 3612, New York, N.Y. 10007

[21] Appl. No.: 243,577

[22] Filed: Mar. 13, 1981

[51] Int. Cl.³ ............................................. H04N 5/76
[52] U.S. Cl. .................................... 358/335; 358/903; 360/33.1; 360/72.2
[58] Field of Search ................... 358/335, 102, 903; 360/72.2, 35.1, 33.1, 79; 369/30, 32, 14, 15

[56] References Cited

U.S. PATENT DOCUMENTS

| | | | |
|---|---|---|---|
| 3,712,956 | 1/1973 | Lemelson | 358/903 |
| 3,803,350 | 4/1974 | Lemelson | 358/102 |
| 3,875,329 | 4/1975 | Nagel | 358/903 |
| 3,881,053 | 4/1975 | Lemelson | 358/903 |
| 4,028,733 | 7/1977 | Ulicki | 358/102 |
| 4,145,715 | 3/1979 | Clever | 358/903 |
| 4,189,744 | 2/1980 | Stern | 358/903 |

Primary Examiner—Alan Faber
Attorney, Agent, or Firm—Richard L. Miller

[57] ABSTRACT

A system which combines a video tape recorder with a computer in such a manner that these two components each automatically record and display where related information is stored in its own mechanism as well as in its counterpart mechanism. This allows the user to determine the location of all the corresponding data stored both on video tape and on diskette, by examining only one storage medium.

13 Claims, 5 Drawing Figures

APPARATUS AND METHOD FOR STORING AND INTERRELATING VISUAL DATA AND COMPUTER INFORMATION

BACKGROUND OF THE INVENTION

This invention relates to apparatus and method for storing data and visual information in orderly concise fashion so that it can be easily located and rapidly recalled in totallity with the assurance that none of the data has been over-looked or is missing by a user of this system with a minimum of searching time expended.

Two systems currently well known in the state of the art presently exist for storing various forms of data. These systems are computers for storing various documentation and records, such as accounts payable, bills due, manuscript, tests, etc.; and video tape recorder systems for storing various forms of events or happenings such as movies, conferences, sporting events, operations, teachings instructions, etc.

It is the purpose of this invention to combine the features of these two conventional systems and interconnect them in such a manner that data readily storable in one type of system can be coordinated with related data readibly storable in the other type of system. The design of the system is such that it automatically coordinates data stored on video tape cartridge with related data stored on comuter floppy disk (also referred to as diskette).

Heretofore information stored on video tapes required that a log or catalogue be kept in order to find a specific video tape, or if the collection was quite large a computer cataloging of them could be kept. Any documentation related to the tapes could also be kept track of in a computer, if properly entered. The problem of coordinating or correlating documentation with video tapes seems rather trivial except when one realizes that in some instances there can be many pages of documentation for each single frame of video tape or in other situations there can be many hundreds or even thousands of frames of video tape for one page or less of documentation on a floppy disk.

An example of the former might be in a court trial where an expert witness might give many pages of testimony about a single photograph (one frame on the video tape), and an example of the latter might be where there is only a brief description of a medical procedure being performed in an operating room.

In either case the system would allow the user to automatically determine instantly which floppy disk data has related information recorded on some particular video tape or viceversa, that is, which video tape cartridge data has some related information recorded on some floppy disk.

The problem of locating related data between video tape cartridges and floppy disks is further compounded when it is realized that because these recording medium have the capability of storing huge amounts of information there may be hundreds or even thousands of unrelated events or information stored on a single floppy disk, or a single video cartridge, and to make matters worse the information need not be in the same specific order.

Heretofore neither computers or a video tape recording system has had the capability of automatically keeping track of where related data is located in a counter part system as well as in its self, at the same time. It is this capability which distinguishes this system from all previous systems.

SUMMARY OF THE INVENTION

The purpose of this invention is to allow recordation of an event or document accurately on video tape wherein notes may be added to the recordation either at the time of occurrence or later on, as an ofter thought, and coordinated automatically in such a manner that they may be automatically recalled and displayed before an audience or even printed at some later time.

The system consists of a video tape camera, a video tape cassette recorder, a computer, and appropriate software.

Typical components for use in such a system are manufactured by Panasonic and Radio Shack and could consist of the Panasonic model numbers PV-A35P Programmable Tuner, PV-3100 Portable Deck, and PK-700 Video Sound Camera, in combination with Radio Shack TRS-80 Model II Micro Computer and peripherals.

A conventional video cassette tape cartridge, and a floppy diskette jacket both are encoded, respectively, with their REEL NUMBER, and DISKETTE NUMBER. This might be done for example with optical characters, mechanical means, magnetic means or any other suitable encoding mechanism.

There are four separate modes in which the system may be operated, depending on the user's need and purpose. These modes are as follows:

(1) Recordation of documents with user's notes to be added later on;

(2) Recordation of documents with user's notes to be made at the time of recordation;

(3) Recordation of a scene, conference, event, etc. with user's notes to be added later on; and (4) Recordation of a scene, conference, event, etc. with user's notes to be made at the time of recordation.

When the system is turned on and loaded with an encoded diskette, and an encoded cassette, the software on the diskette will instruct the microprocessor to record both the Reel #, Frame #, Diskette #, and file address # on both the floppy diskette and the video tape cartridge and display the same on the microprocessor video display and VTR video display. The system will continually scan, display, and record these four pieces of data so that the user will know at all times the location of the displayed data.

When recording documents with user's note to be added, the system can be advanced a frame at a time while individual documents are placed in view of the camera and recorded each time the operator or user instructs the system to record a document. When a document is recorded, the frame number will automatically advance one frame and be recorded on the video tape along with the document and other location numbers. If the user is adding notes at the same time as recording the documents, he will enter his noes by typing them into the microprocessor keyborad. The notes will be recorded on the diskette along with the automatic entry of the corresponding reel #, frame #, diskette #, and file address # of the document just recorded on the video tape. The microprocessor will also instruct the system to likewise record the same four data address location numbers on the video frame just recorded.

When at some point in the future it is required to recall data recorded in the system, either if just the video cartridge or if just the diskette is examined in the system, it will be immediately determinable where the rest of the data is recorded since reel, frame, diskette, and file address numbers will have been recorded on every frame of the video cassette as well as on every file entry made on the diskette, and displayed on both video screens.

Depending on which mode the system is operating, notes may be added to supplment the documentation being recorded on the video tape either at the same time that the tape data is being recorded or all the documentation can be recorded first on the tape and later on the user can come back and add individual additional information and notes on the diskette, as best suits his purpose.

The system as heretofore described is one to be used for recording documentation or individual still scenes, and is ideal for editing documents with photographs, recording evidence at a crime scene, or recording material of a physical nature by engineers, lawyers, doctors, detectives etc. wherein the nature of the material is such that it might otherwise normally be photographed by a conventional still camera and is of a still or singular nature.

However, when desired to record an event such as an operation or in a hospital operating room, testimony of a witness at a trial, a conference between parties, the motion of moving machinery and parts coordinating with each other, or even to spy upon individuals for intelligence purposes, the system can be used in a different mode of operation.

In this situation the video camera is allowed to continuously record the scene or event taking place just as one might do with a motion picture camera. All the while the system is recording the reel and frame numbers on the video tape. Depending on the need and nature of the user's comments, these can be either entered after recording on the video tape and coordinated with the appropriate reel and frame numbers, or if the user is able to type relatively rapidly and has only few comments to add, these comments may be made while the camera is recording.

It is to be noted that while the frame number is a convenient parameter to have at ones accessibility, that the system is quite operative with other parameters which indicate the position of the video tape information.

The aforementioned objects, features and advantages of the invention will, in part, be pointed out with particularity, and will, in part, become obvious from the following more detailed description of the invention taken in conjunction with the accompanying drawings, which forms an integral part thereof, and in which like numbers represent or characterize the same or similar parts regardless of the figure in which they appear.

BRIEF DESCRIPTION OF THE DRAWINGS

In the drawings the figures are briefly described as follows.

DESCRIPTION OF THE PREFERRED EMBODIMENTS

Figure 1:
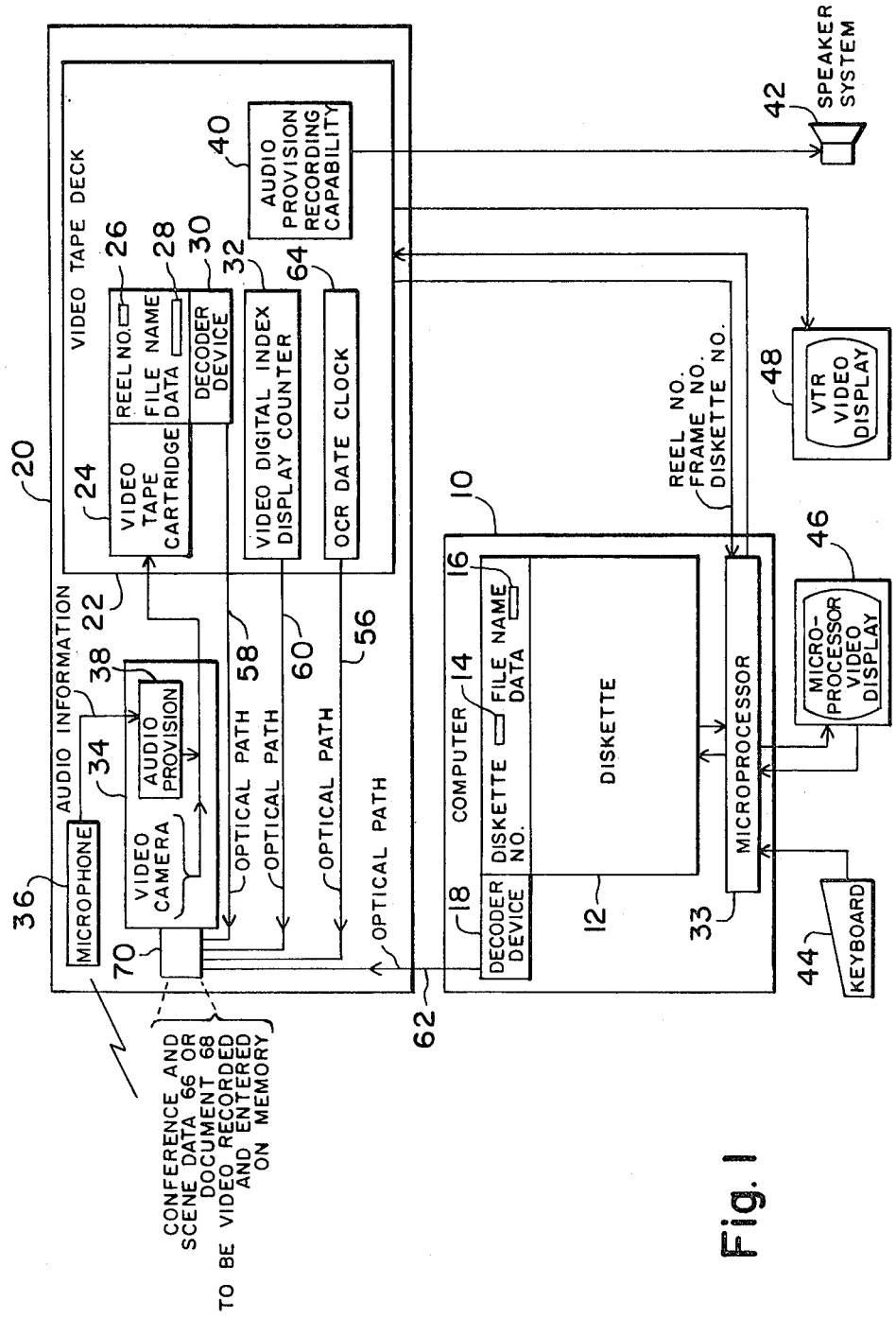
FIG. 1 is a block diagram representing an information storage system wherein data address location information is entered directly into the optical path of a video camera of the video portion of the system.

As shown in FIG. 1, a basic microcomputer such as the Radio Shack TRS-80 MODEL II MICRO COMPUTER is schematically shown at 10. Inserted in the disk drive of this computer is a conventional floppy diskette 12 which has been encoded on its jacket with its own diskette number 14 and any other pertinent data at 16. Instead of a diskette, any other type of memory medium recorded with the video tape reel and frame number, the storage medium file and address numbers and other conference and scene data or documentation data, could also be used. Built into the disk drive of the computer is a conventional decoding device 18, which automatically decodes the encoded diskette number 14 and the other data 16 contained on the particular diskette which has been inserted into the disk drive of the computer.

Also schematically shown in FIG. 1 there is a video cassette recorder and camera system 20 which typically might be a joined combination of Panasonic model numbers PV-A35P, PV-3100, and PK-700. Inserted in the cassette drive of the video tape deck 22 portion of this combination system is a conventional video tape cartridge 24 which has been encoded with its own particular reel number (cartridge number) 26 and any other pertinent data 28. Likewise built into the tape deck portion of this video system is a conventional decoding device 30, which automatically decodes the encoded reelnumber 26 and other data 28 contained on the particular cartridge which has been inserted into the tape deck of the video system.

In addition, the video tape deck 22 is provided with a digital index counter device 32, which continually keeps track of the position of the tape and indicates how far the tape has advanced. This counter device for additional convenience may have a visual direct display, as is conventional in most tape decks, but far more important is that the counter has the capability of transmitting this tape position information to the rest of the system.

These three pieces of information, that is:
(1) The diskette number 14 and other pertinent data 16;
(2) The reel number 26 and any other pertinent data 28, and
(3) The tape position information;
are automatically entered into the microprocessor portions 33 of the microcomputer 10 either directly or at some other point in the system, as will hereinafter be explained.

If the information encoded in the form of optical encoded characters, such as ANSI-OCR (American National Standard Institute-Optical Character Recognition), than it may be expedient to enter the information right into the optical path of the camera or a second practical alternative is to scan this information in a conventional manner and enter the information directly into the microprocessor. In any case these three pieces of information, along with the file address number of the information being entered on the diskette are all entered into the information loop of the system and are all recorded on each frame of the video tape as well as on each file page of information recorded on the diskette.

A video camera 34 is used for entering the visual information into the system. This information can be a scene or an event 66, or it can be various documents 68. The camera may also be provided with a microphone 36 and an audio transmission capability 38, as is conventional with many video cameras. If such is the case then a tape deck also would be provided with audio recording capability 40, and sound occurring in the vicinity of the recording scene could then be recorded, as is conventional with many video taping systems. This sound could naturally be heard through the appropriate speaker system 42.

As is conventional with most computers there is required a keyboard 44, so that data may be typed into the system whereby the user can add his comments onto the diskette about the information being recorded by the video portion of the system from the camera input.

Also, it is desirable to have at least one video display monitor to display either the video tape information or the diskette file information. In FIG. 1 there are illustrated two displays, one to display diskette information at 46, and the other to display video information at 48, thereby eliminating the inconvenience and need for the user to have to switch displays back and forth on one monitor.

Figure 2:
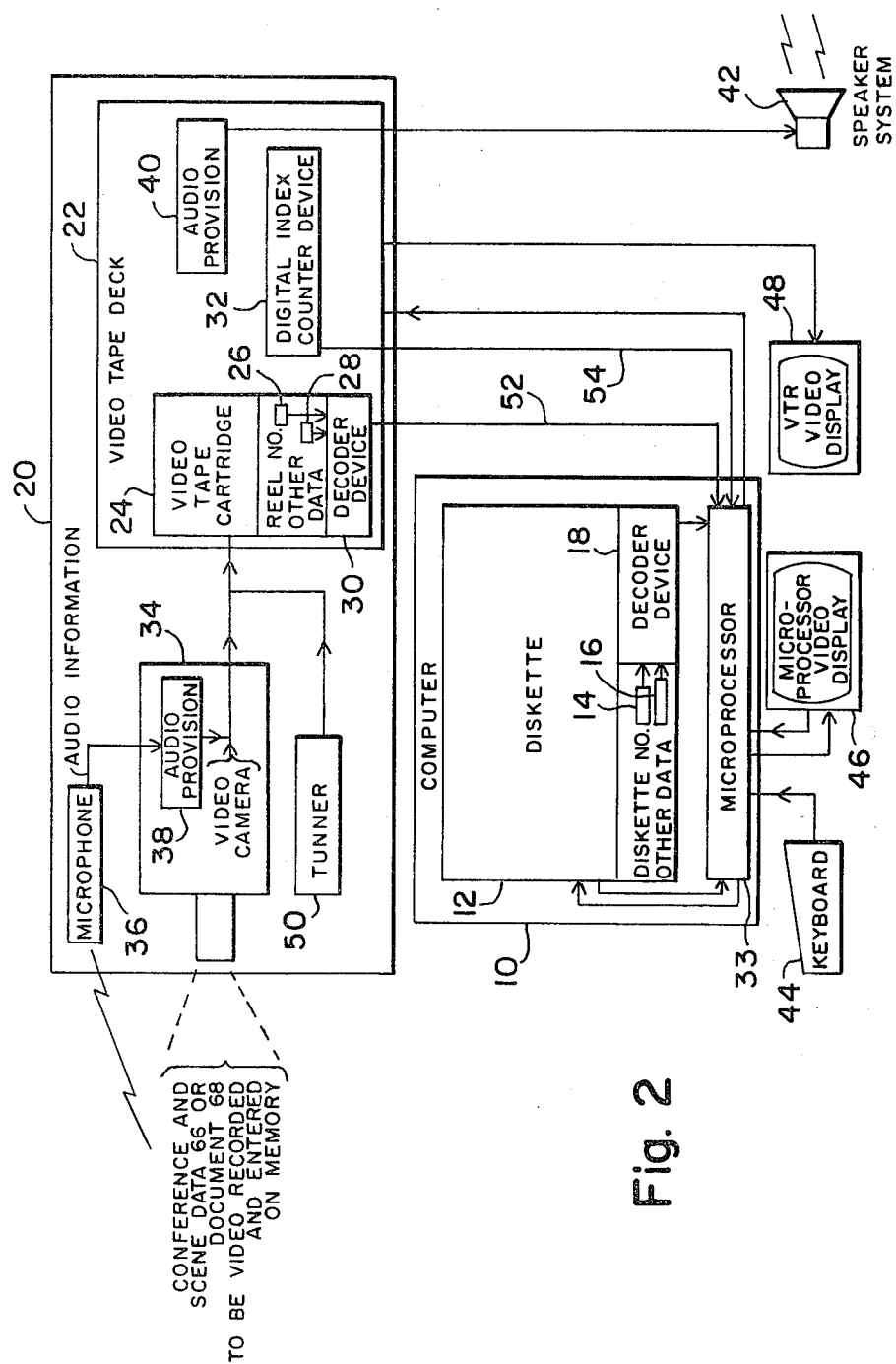
FIG. 2 is a block diagram similar to that of FIG. 1 except that data address location information is entered directly into the microprocessor of the computer portion of the system.

FIG. 2 shows a modification of the system, wherein data to be tape recorded with the user's notes to be added could be received on a conventional video tuner 50 and be fed into the input of the tape deck in a conventional manner, instead of using a camera input. This would be useful to users who wished to write notes about television programs, etc.

In FIG. 2 it is to be noted that the reel and frame number data is entered directly into the microprocessor through paths 52 and 54, whereas in FIG. 1 the reel and frame number data are correspondingly entered into the optical paths 58 and 60 of the camera. In addition, in the system of FIG. 1 diskette number data is also entered directly into optical path 62 of the camera whereas in FIG. 2 the diskette number data is entered directly into the microprocessor.

Entering this data location information into the optical path of the camera system makes the video system 20 of FIG. 1 operative as an independent subsystem in such a manner that the video system can be used by itself as a portable system, as are many conventional video camera recording systems. In addition, this video system automatically enters the data location information directly onto the video tape so that later on when the user wishes to add notes or comments onto a corresponding diskette which is to be coordinated with the video tape, the reel and frame numbers will already be entered onto the video tape. In that way they may be automatically entered by the microprocessor and its software onto the new diskettes as its files are being created.

These four pieces of data address location information could be conveniently displayed in the upper right hand corner; or any other convenient screen location, of both video monitors and in the optical path entry system would depend on the geometry of the camera optics as to the location of the display on the VTR monitor. The location of the display on the microprocessor monitor would depend on logic circuitry in the microprocessor.

Another features of this invention is the capability of the system to enter and display the time and date on both the video tape and diskette recording mediums as well as on both video monitors along with the data address location information. This is easily accomplished with state of the art microprocessing techniques. In the system of FIG. 1 the time information can be entered directly on the video tape even when the video portion is used separately, because it has an OCR numerical clock 64 with data and time information also being entered into the optical path 56 of the camera 34.

Figure 5:
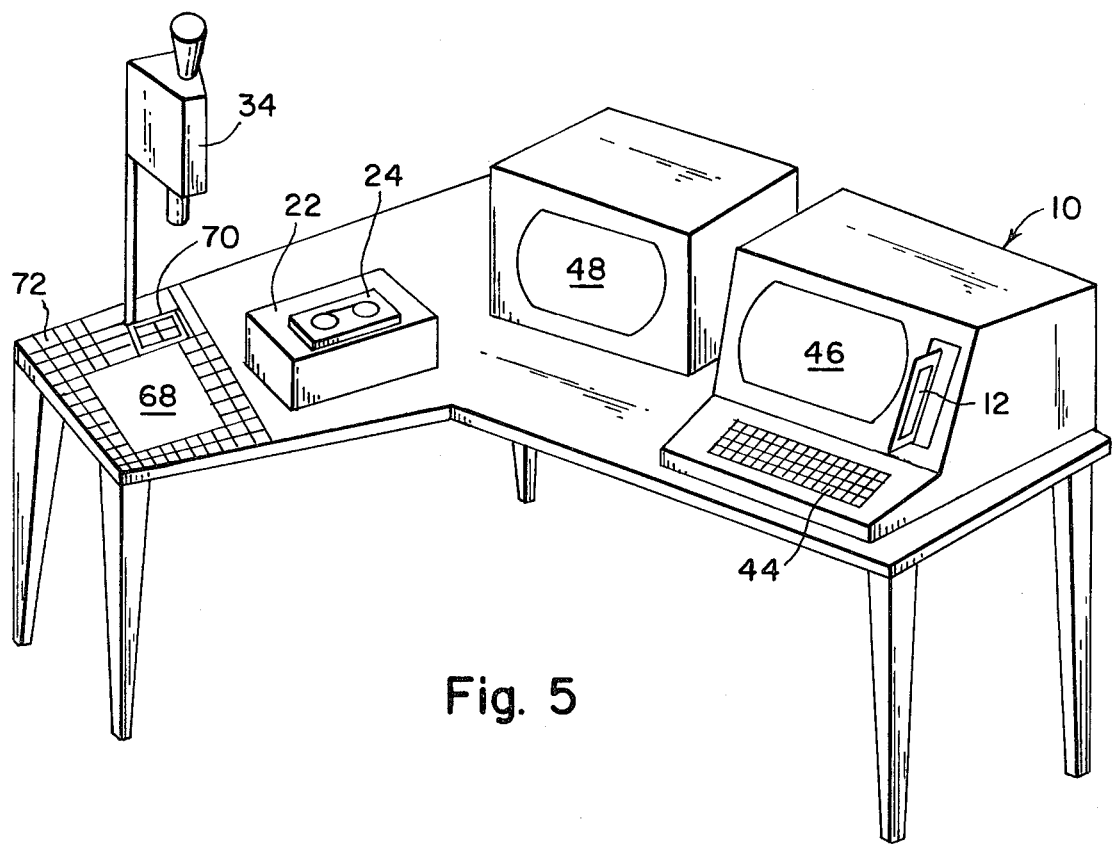
FIG. 5 is a perspective view of a typical system hardware setup primarily for recording documentation.

In FIG. 5 there is illustrated a simple and direct method of entering variable data such as a reel number, frame number, diskette number, and even time and data information, in the optical path of the video camera. This data is remotely displayed on device indicators 70, mounted on the camera bed 72, in the upper right hand corner area of a document 68, to be video recorded. In this way, the information on the indicators is recorded along with and simultaneously with the video recording of the document on the camera bed.

Figure 3:
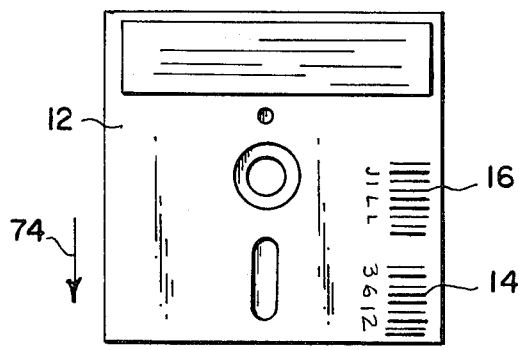
FIG. 3 shows a floppy disk (also referred to as a diskette) with a typical example of the diskette number and other pertinent data encoded on the lower right side of the diskette jacket.
Figure 4:
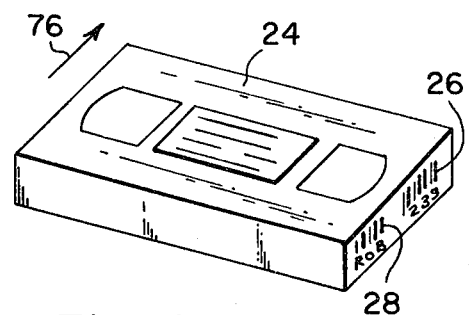
FIG. 4 shows a video tape cartridge with a typical example of the real number and other pertinent data encoded on the right hand edge of the tape cartridge.

FIGS. 3 and 4 show typical computers, and video recording mediums 12, and 24 respectively. The arrows 74 and 76 in these figures indicate the normal direction in which these devices are inserted in order to load them into their respective equipment. Optically encoded diskette number and other pertinent information are shown at 14 and 16, respectively, while similar encoded reel number (video tape cartridge number) and other pertinent information are shown at 26 and 28, respectively. This encoded information may be optically scanned or encoded in any number of ways which are well known in the state of the art. In fact, the encoding and decoding mechanism of this information need not necessarily be of an optical nature at all.

There has been disclosed heretofore the best embodiments of the invention presently contemplated. However, it is to be understood that various changes and modifications may be made thereto without departing from the spirit of the invention.

What is claimed is:

1. An information storage system, comprising:
   (a) a video tape recorder subsystem for recording and storing information of a visual nature at specified video addresses for subsequent visual display;
   (b) a computer subsystem for recording and storing related data information at specified data addresses for subsequent output;
   (c) interfacing means interconnecting said video tape recorder subsystem and said computer subsystem for causing both said subsystems to automatically record and store the address location of information being recorded in its own subsystem as well as the address location of the related information being recorded in the other subsystem; and
   (d) means for independently obtaining the output of each subsystem, said output including the address location of the related information on the other subsystem.

2. An information storage system as in claim 1, wherein said interfacing means comprises decoding means for decoding the addresses of stored information in one of said sub system and entering it into the other of said subsystems.

3. An information storage system as in claim 2, wherein said video subsystem comprises an input video camera for receiving visual information along an optical input path and wherein said interfacing means further comprises remote indicator means located in said optical input path, and displaying means for displaying the addresses of stored information in said subsystems, whereby said addresses will be recorded on video tape.

4. An information storage system as in claim 3, wherein said remote indicators comprise a set of characters which are optically recognizable so they may be processed by circuitry and logic of said computer subsystem.

5. An information storage system as in claim 3, wherein said remote indicators are located on the camera bed of said input video camera whereby documents and address information will be recorded simultaneously.

6. An information storage system as in claim 2, wherein said decoding means enters the addresses directly into the microprocessor of said computer.

7. An information storage system as in claim 2, wherein said interfacing means further comprises means for entering time and date information into said subsystems.

8. An information storage system as in claim 1, and further comprising video camera means for producing video input information to said video subsystem.

9. An information storage system as in claim 1, and further comprising a video tuner for providing video input information to said video subsystem.

10. An information storage system as in claim 1, and further comprising a keyboard for entering information into said computer subsystem.

11. A method for storing data in an information storage system, comprising the steps of:
(a) placing a document on a camera bed in position for video recording;
(b) determining the address location in the video recording on which the document will be recorded;
(c) typing information related to the document into a microprocessor of a computer system;
(d) determining the address location in the microprocessor where the related information will be stored;
(e) causing the system to video tape the documents on the video recorder and store the information typed into the microprocessor;
(f) including the video recording address location as part of the information stored in the microprocessor and including the microprocessor address location as part of the document taped; and
(g) independently displaying the stored information in the microprocessor with the video recording address location and displaying the video taped document with the microprocessor address location, as two separate outputs.

12. A method as in claim 11, and further comprising the step of automatically displaying the location of the information entered into the microprocessor as well as time/date information in a position near the document on the camera bed whereby the location and time/date information will be video tape recorded at the same time as the document.

13. A method as in claim 11, and further comprising the step of automatically advancing the location information for each subsequent document to be recorded.

* * * * *